(12) United States Patent
Taki (10) Patent No.: US 12,533,098 B2
(45) Date of Patent: Jan. 27, 2026

(54) RADIATION IMAGE PROCESSING DEVICE, RADIATION IMAGE PROCESSING METHOD, AND RADIATION IMAGE PROCESSING PROGRAM

(71) Applicant: FUJIFILM Corporation, Tokyo (JP)

(72) Inventor: Tomoko Taki, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 384 days.

(21) Appl. No.: 18/059,810

(22) Filed: Nov. 29, 2022

(65) Prior Publication Data

US 2023/0172576 A1 Jun. 8, 2023

(30) Foreign Application Priority Data

Dec. 2, 2021 (JP) .................................. 2021-196394

(51) Int. Cl.
*A61B 6/00* (2024.01)
*A61B 6/50* (2024.01)

(52) U.S. Cl.
CPC ............ *A61B 6/5217* (2013.01); *A61B 6/505* (2013.01); *A61B 6/5241* (2013.01); *A61B 6/5282* (2013.01)

(58) Field of Classification Search
CPC ..... A61B 6/5217; A61B 6/505; A61B 6/5241; A61B 6/5282; A61B 6/482
See application file for complete search history.

(56) References Cited

U.S. PATENT DOCUMENTS

| | | | |
|---|---|---|---|
| 2016/0140720 A1 | 5/2016 | Naito | |
| 2018/0122094 A1 | 5/2018 | Naito | |
| 2018/0263559 A1* | 9/2018 | Kawamura | A61B 6/032 |
| 2019/0374185 A1* | 12/2019 | Takahashi | A61B 6/463 |
| 2019/0374186 A1* | 12/2019 | Oda | A61B 6/5205 |
| 2020/0408704 A1* | 12/2020 | Iwashita | A61B 6/4233 |
| 2022/0076397 A1* | 3/2022 | Torii | A61B 6/482 |

FOREIGN PATENT DOCUMENTS

| | | |
|---|---|---|
| JP | H07-284020 A | 10/1995 |
| JP | 2004-147863 A | 5/2004 |
| JP | 2015-043959 A | 3/2015 |

OTHER PUBLICATIONS

"Notice of Reasons for Refusal" Office Action issued in JP 2021-196394; mailed by the Japanese Patent Office on May 13, 2025.
"Decision of Refusal" Office Action issued in JP 2021-196394; mailed by the Japanese Patent Office on Sep. 30, 2025.

* cited by examiner

*Primary Examiner* — Amandeep Saini
*Assistant Examiner* — Andrew S Budisalich
(74) *Attorney, Agent, or Firm* — Studebaker Brackett PLLC (57) ABSTRACT

A processor derives a bone part image of a subject including a bone part based on a first radiation image and a second radiation image acquired by imaging the subject with radiation having different energy distributions, derives a fat percentage distribution or a muscle percentage distribution of the subject based on the first radiation image and the second radiation image, and derives a bone density in a bone region of the subject based on the bone part image, and the fat percentage distribution or the muscle percentage distribution.

5 Claims, 6 Drawing Sheets

RADIATION IMAGE PROCESSING DEVICE, RADIATION IMAGE PROCESSING METHOD, AND RADIATION IMAGE PROCESSING PROGRAM

CROSS REFERENCE TO RELATED APPLICATIONS

The present application claims priority under 35 U.S.C. § 119 to Japanese Patent Application No. 2021-196394 filed on Dec. 2, 2021. The above application is hereby expressly incorporated by reference, in its entirety, into the present application.

BACKGROUND

Technical Field

The present disclosure relates to a radiation image processing device, a radiation image processing method, and a radiation image processing program.

Related Art

A dual x-ray absorptiometry (DXA) method is known as one of typical bone mineral quantification methods used for diagnosing a bone density in a bone system disease, such as osteoporosis. The DXA method is a method for calculating bone density from a pixel value of a radiation image obtained by performing imaging by the radiation of two types of energies by using radiation incident on and transmitted through a human body, which is attenuated by an attenuation coefficient $\mu$ ($cm^2/g$), density ($g/cm^3$) and a thickness t (cm), which depend on a substance (for example, a bone) that configures the human body.

In addition, various methods for evaluating the bone density using a radiation image acquired by imaging a subject have been proposed. For example, JP1995-284020A (JP-H07-284020A) proposes a method in which from a plurality of radiation images acquired by radiation transmitted through the subject and having different energy distributions, a bone part image obtained by extracting a bone part of a subject is generated, a concentration of a region in which a bone is not present in the radiation image is calculated as a correction value representing a fat mass, and a pixel value of the bone part image is corrected by the correction value to calculate the concentration of the bone region and the bone density with higher accuracy.

By the way, an attenuation coefficient of the radiation is changed in accordance with a ratio of fat included in a soft part of the subject, that is, a fat percentage. Therefore, even in a case in which a body thickness is the same, an influence of beam hardening of the radiation is changed in accordance with the fat percentage. Specifically, the energy of the transmitted radiation is lower as the fat percentage is higher, so that a contrast of the bone region in the acquired radiation image is increased. As a result, a derived bone density value is larger as the fat percentage is higher. Therefore, even in a case in which the bone density is the same, there is a problem that an error occurs in the bone density depending on the fat percentage.

SUMMARY OF THE INVENTION

The present disclosure has been made in view of the above circumstances, and is to enable derivation of the bone density with high accuracy.

The present disclosure relates to a radiation image processing device comprising at least one processor, in which the processor derives a bone part image of a subject including a bone part based on a first radiation image and a second radiation image acquired by imaging the subject with radiation having different energy distributions, derives a fat percentage distribution or a muscle percentage distribution of the subject based on the first radiation image and the second radiation image, and derives a bone density in a bone region of the subject based on the bone part image, and the fat percentage distribution or the muscle percentage distribution.

Note that, in the radiation image processing device according to the present disclosure, the processor may derive a body thickness distribution of the subject based on the first radiation image and the second radiation image, refer to a relationship between a fat percentage or a muscle percentage, and a conversion coefficient for converting the body thickness distribution of the subject into a body thickness distribution of a standard soft part to acquire the conversion coefficient in accordance with the fat percentage distribution or the muscle percentage distribution, convert the body thickness distribution of the subject into the body thickness distribution of the standard soft part by converting the body thickness distribution of the subject by the conversion coefficient, refer to a relationship between the body thickness distribution and a correction coefficient for correcting a pixel value of the bone part image to the bone density to acquire the correction coefficient in accordance with the body thickness distribution of the standard soft part, and derive the bone density by correcting the bone part image by the correction coefficient.

The "standard soft part" is a soft part that has an attenuation coefficient and a fat percentage or a muscle percentage that correspond to a soft part, which is a standard, of a human body. A substance corresponding to the soft part, which is a standard, of the human body can be applied as the standard soft part. Acrylic, urethane, or the like can be applied as the substance corresponding to the soft part, which is a standard, of the human body. Note that the correction coefficient for correcting the pixel value of the bone part image to the bone density can be derived by using the radiation image of a phantom consisting of substances corresponding to the standard soft part and having various thicknesses.

In addition, in the radiation image processing device according to the present disclosure, the processor may remove a scattered ray component based on the radiation scattered by the subject from the first radiation image and the second radiation image, and perform derivation of the fat percentage distribution or the muscle percentage distribution, and derivation of the bone density by using the first and second radiation images from which the scattered ray components are removed.

In addition, in the radiation image processing device according to the present disclosure, the processor may display the bone density on a display.

The present disclosure relates to a radiation image processing method comprising deriving a bone part image of a subject including a bone part based on a first radiation image and a second radiation image acquired by imaging the subject with radiation having different energy distributions, deriving a fat percentage distribution or a muscle percentage distribution of the subject based on the first radiation image and the second radiation image, and deriving a bone density in a bone region of the subject based on the bone part image, and the fat percentage distribution or the muscle percentage distribution.

The present disclosure relates to a radiation image processing program causing a computer to execute a procedure of deriving a bone part image of a subject including a bone part based on a first radiation image and a second radiation image acquired by imaging the subject with radiation having different energy distributions, a procedure of deriving a fat percentage distribution or a muscle percentage distribution of the subject based on the first radiation image and the second radiation image, and a procedure of deriving a bone density in a bone region of the subject based on the bone part image, and the fat percentage distribution or the muscle percentage distribution.

According to the present disclosure, it is possible to derive the bone density with high accuracy.

DETAILED DESCRIPTION

Figure 1:
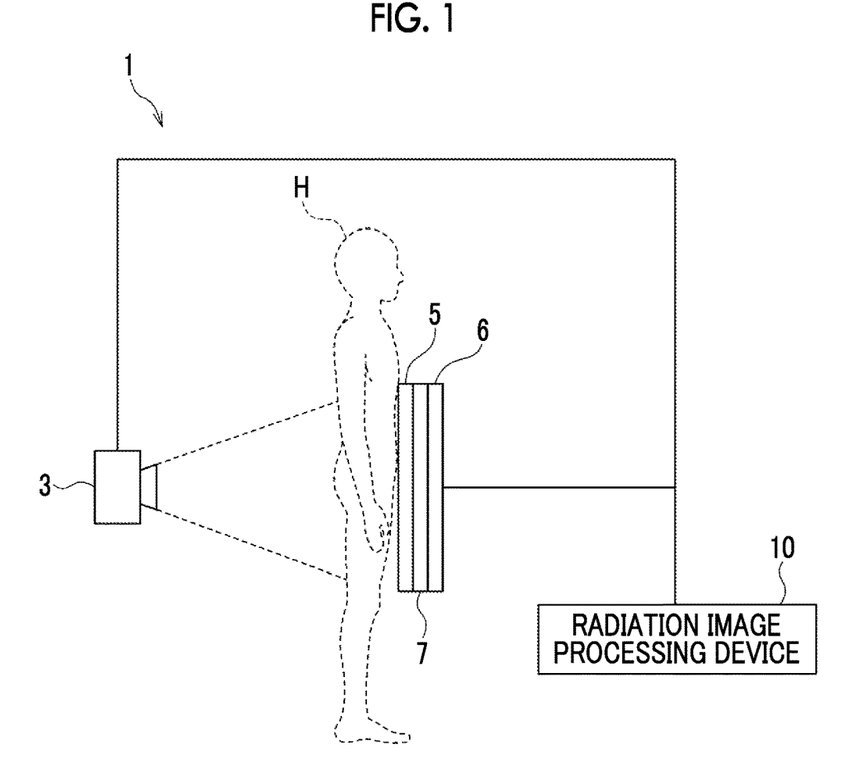
FIG. 1 is a schematic block diagram showing a configuration of a radiography system to which a radiation image processing device according to an embodiment of the present disclosure is applied.

In the following, an embodiment of the present disclosure will be described with reference to the drawings. FIG. 1 is a schematic block diagram showing a configuration of a radiography system to which a radiation image processing device according to the embodiment of the present disclosure is applied. As shown in FIG. 1, the radiography system according to the present embodiment comprises an imaging apparatus 1 and a radiation image processing device 10 according to the present embodiment.

The imaging apparatus 1 is an imaging apparatus for performing energy subtraction by a so-called one-shot method for converting radiation, such as X-rays, emitted from a radiation source 3 and transmitted through a subject H into energy and irradiating a first radiation detector 5 and a second radiation detector 6 with the converted radiation. At the time of imaging, as shown in FIG. 1, the first radiation detector 5, a radiation energy conversion filter 7 made of a copper plate or the like, and the second radiation detector 6 are disposed in order from a side closest to the radiation source 3, and the radiation source 3 is driven. Note that the first and second radiation detectors 5 and 6 are closely attached to the radiation energy conversion filter 7.

As a result, in the first radiation detector 5, a first radiation image G1 of the subject H by low-energy radiation also including so-called soft rays is acquired. In addition, in the second radiation detector 6, a second radiation image G2 of the subject H by high-energy radiation from which the soft rays are removed is acquired. The first and second radiation images are input to the radiation image processing device 10.

The first and second radiation detectors 5 and 6 can perform recording and reading-out of the radiation image repeatedly. A so-called direct-type radiation detector that directly receives emission of the radiation and generates an electric charge may be used, or a so-called indirect-type radiation detector that converts the radiation into visible light and then converts the visible light into an electric charge signal may be used. In addition, as a method for reading out a radiation image signal, it is desirable to use a so-called thin film transistor (TFT) readout method in which the radiation image signal is read out by turning a TFT switch on and off, or a so-called optical readout method in which the radiation image signal is read out by emission of read out light. However, other methods may also be used without being limited to these methods.

Figure 2:
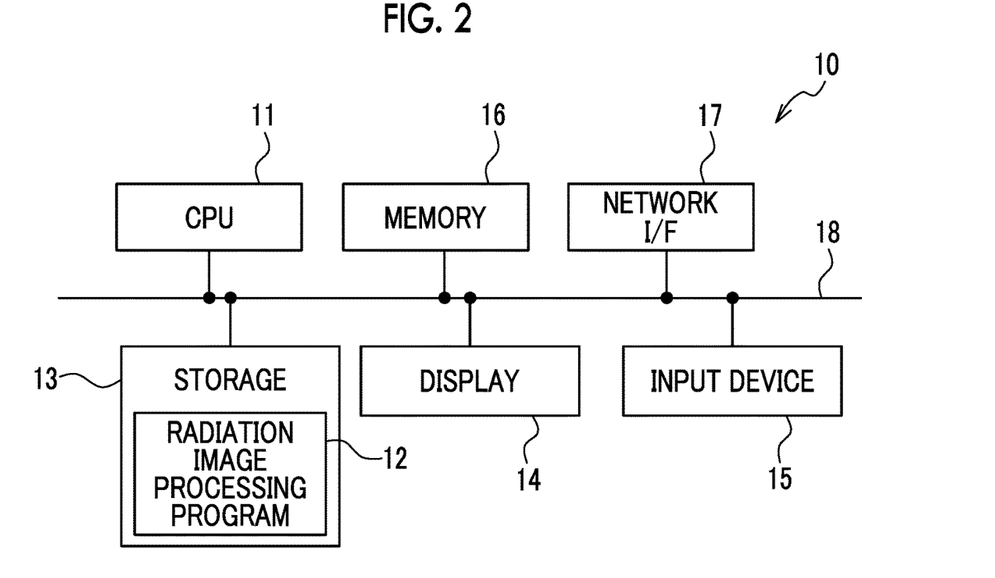
FIG. 2 is a diagram showing a schematic configuration of the radiation image processing device according to the embodiment of the present disclosure.

Then, the radiation image processing device according to the present embodiment will be described. First, with reference to FIG. 2, a hardware configuration of the radiation image processing device according to the present embodiment will be described. As shown in FIG. 2, the radiation image processing device 10 is a computer, such as a workstation, a server computer, and a personal computer, and comprises a central processing unit (CPU) 11, a non-volatile storage 13, and a memory 16 as a transitory storage region. In addition, the radiation image processing device 10 comprises a display 14, such as a liquid crystal display, an input device 15, such as a keyboard and a mouse, and a network interface (I/F) 17 connected to a network (not shown). The CPU 11, the storage 13, the display 14, the input device 15, the memory 16, and the network I/F 17 are connected to a bus 18. Note that the CPU 11 is an example of a processor according to the present disclosure.

The storage 13 is realized by a hard disk drive (HDD), a solid state drive (SSD), a flash memory, and the like. A radiation image processing program 12 installed in the radiation image processing device 10 is stored in the storage 13 as a storage medium. The CPU 11 reads out the radiation image processing program 12 from the storage 13, expands the read out radiation image processing program 12 to the memory 16, and executes the expanded radiation image processing program 12.

Note that the radiation image processing program 12 is stored in a storage device of the server computer connected to the network or in a network storage in a state of being accessible from the outside, and is downloaded and installed in the computer that configures the radiation image processing device 10 in response to the request. Alternatively, the radiation image processing program 12 is distributed in a state of being recorded on a recording medium, such as a digital versatile disc (DVD) or a compact disc read only memory (CD-ROM), and is installed in the computer that configures the radiation image processing device 10 from the recording medium.

Figure 3:
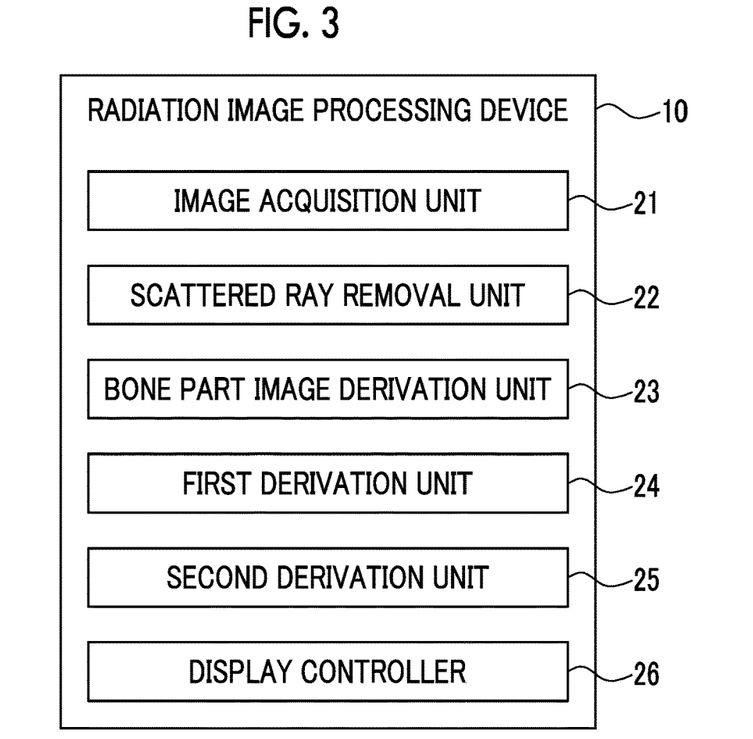
FIG. 3 is a diagram showing a functional configuration of the radiation image processing device according to the embodiment of the present disclosure.

Then, a functional configuration of the radiation image processing device according to the present embodiment will be described. FIG. 3 is a diagram showing the functional configuration of the radiation image processing device according to the present embodiment. As shown in FIG. 3, the radiation image processing device 10 comprises an image acquisition unit 21, a scattered ray removal unit 22, a bone part image derivation unit 23, a first derivation unit 24, a second derivation unit 25, and a display controller 26. Moreover, by executing the radiation image processing program 12, the CPU 11 functions as the image acquisition unit 21, the scattered ray removal unit 22, the bone part image derivation unit 23, the first derivation unit 24, the second derivation unit 25, and the display controller 26.

The image acquisition unit 21 acquires the first radiation image G1 and the second radiation image G2 of the subject H from the first and second radiation detectors 5 and 6 by causing the imaging apparatus 1 to perform the energy subtraction imaging of the subject H. In a case in which the first radiation image G1 and the second radiation image G2 are acquired, an imaging conditions, such as an imaging dose, a radiation quality, a tube voltage, a source image receptor distance (SID) which is a distance between the radiation source 3 and surfaces of the first and second radiation detectors 5 and 6, a source object distance (SOD) which is a distance between the radiation source 3 and a surface of the subject H, and the presence or absence of a scattered ray removal grid are set.

The SOD and the SID are used to calculate a body thickness distribution as described below. It is preferable that the SOD be acquired by, for example, a time of flight (TOF) camera. It is preferable that the SID be acquired by, for example, a potentiometer, an ultrasound range finder, a laser range finder, or the like.

The imaging conditions need only be set by input from the input device 15 by an operator.

The scattered ray removal unit 22 removes the scattered ray component from each of the first radiation image G1 and the second radiation image G2 acquired by the image acquisition unit 21. In the following, the removal of the scattered ray component will be described. As a method for removing the scattered ray component, for example, any method, such as a method disclosed in JP2015-043959A, can be used. In the following, scattered ray removal processing in a case in which the method disclosed in JP2015-043959A is used will be described. Note that, in the following description, G1 and G2 will be used as reference numerals for the first and second radiation images from which the scattered ray component is removed.

First, the scattered ray removal unit 22 acquires a virtual model of the subject H having an initial body thickness distribution Ts(x,y). The virtual model is data virtually representing the subject H of which a body thickness in accordance with the initial body thickness distribution Ts(x,y) is associated with a coordinate position of each pixel of the first radiation image G1. Note that the virtual model of the subject H having the initial body thickness distribution Ts(x,y) is stored in the storage 13 in advance, but the virtual model may be acquired from an external server in which the virtual model is stored.

Next, as shown in Expression (1) and Expression (2), the scattered ray removal unit 22 derives an estimated primary ray image Ip(x,y) obtained by estimating a primary ray image obtained by imaging the virtual model and an estimated scattered ray image Is(x,y) obtained by estimating a scattered ray image obtained by imaging the virtual model, based on the virtual model. Further, as shown in Expression (3), the scattered ray removal unit 22 derives an image obtained by combining the estimated primary ray image Ip(x,y) and the estimated scattered ray image Is(x,y) as an estimated image Im(x,y) obtained by estimating the first radiation image G1 obtained by imaging the subject H.

$$Ip(x,y)=Io(x,y)\times \exp(-\mu \text{Soft}T(x,y))\times T(x,y)) \quad (1)$$

$$Is(x,y)=Io(x,y)\times STPR(T(x,y))*PSF(T(x,y)) \quad (2)$$

$$Im(x,y)=Is(x,y)+Ip(x,y) \quad (3)$$

Here, (x,y) is a coordinate of a pixel position of the first radiation image G1, Io(x,y) is a pixel value of the first radiation image G1 at the pixel position (x,y), Ip(x,y) is the primary ray component at the pixel position (x,y), and Is(x,y) is the scattered ray component at the pixel position (x,y). Note that, in a case of deriving the first estimated image Im(x,y), the initial body thickness distribution Ts(x,y) is used as the body thickness distribution T(x,y) in Expression (1) and Expression (2).

In addition, μSoft(T(x,y)) in Expression (1) is an attenuation coefficient in accordance with the body thickness distribution (x,y) of the soft tissue of the human body at the pixel position (x,y). The μSoft(T(x,y)) need only be obtained in advance experimentally or by simulation and stored in the storage 13. Note that, in the present embodiment, as the attenuation coefficient μSoft(T(x,y)), an attenuation coefficient of a standard soft part described below is used. In addition, the STPR(T(x,y)) in Expression (2) is a ratio (scatter-to-primary ratio) of a scattered dose to a primary dose included in the radiation after being transmitted through the subject H having the body thickness distribution T(x,y). The STPR(T(x,y)) need only also be obtained in advance experimentally or by simulation, and stored in the storage 13.

In addition, the PSF(T(x,y)) in Expression (2) is a point spread function representing the distribution of the scattered rays spreading from one pixel in accordance with the body thickness distribution T(x,y), and is defined in accordance with the energy characteristic of the radiation. In addition, * is an operator representing a convolution operation. The PSF is also changed due to a distribution of irradiation fields in the imaging apparatus 1, a distribution of the compositions of the subject H, the irradiation dose at the time of imaging, the tube voltage, an imaging distance, the characteristics of the radiation detectors 5 and 6, and the like. Therefore, the PSF need only be experimentally obtained in advance for each energy characteristic of the radiation used by the imaging apparatus 1 in accordance with irradiation field information, subject information, the imaging condition, and the like, and stored in the storage 13.

Next, the scattered ray removal unit 22 corrects the initial body thickness distribution Ts(x,y) of the virtual model such that a difference between the estimated image Im and the first radiation image G1 is small. The scattered ray removal unit 22 updates the body thickness distribution T(x,y), the scattered ray component Is(x,y), and the primary ray component Ip(x,y) by repeating the derivation of the body thickness distribution T(x,y), the scattered ray component Is(x,y), and the primary ray component Ip(x,y) until a difference between the estimated image Im and the first radiation image G1 satisfies a predetermined termination condition. The scattered ray removal unit 22 subtracts the scattered ray component Is(x,y) derived by Expression (3) from the first radiation image G1 in a case in which the termination condition is satisfied. As a result, the scattered ray component included in the first radiation image G1 is removed. Note that the body thickness distribution T(x,y) derived in a case in which the termination condition is satisfied is used for a bone density described below is derived.

On the other hand, the scattered ray removal unit 22 also performs the scattered ray removal processing on the second radiation image G2 in the same manner as in the first radiation image G1. Note that, in the following description, G1 and G2 will be used as reference numerals for the first and second radiation images from which the scattered ray components are removed.

Figure 4:
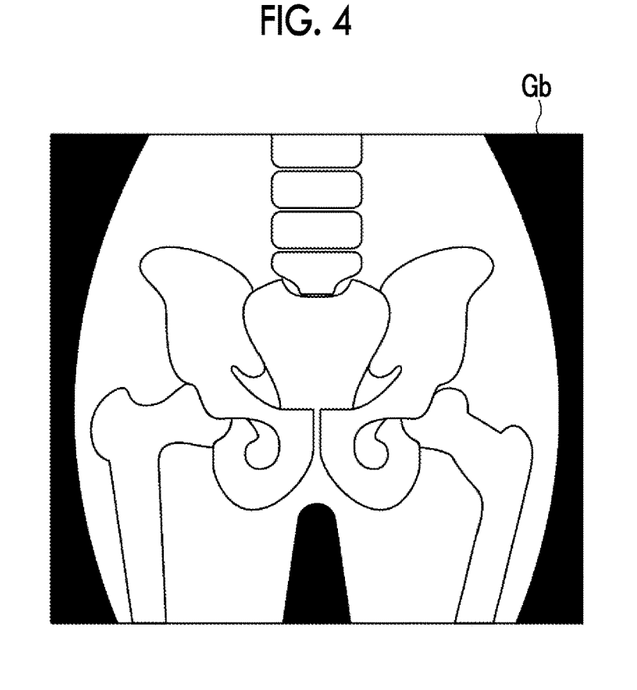
FIG. 4 is a diagram showing a soft part image.

The bone part image derivation unit 23 generates a bone part image Gb representing the bone region of the subject H from the first and the second radiation images G1 and G2 from which the scattered ray components are removed by the scattered ray removal unit 22. FIG. 4 is a diagram showing an example of the bone part image Gb generated by the bone part image derivation unit 23. Note that a lumbar vertebra or a femur is generally used for the measurement of the bone density. Therefore, the bone part image Gb shown in FIG. 4 shows the bone part image Gb generated from the first radiation image G1 and the second radiation image G2 obtained by performing imaging including a part of the femur and the lumbar vertebra of the subject H.

The bone part image derivation unit 23 generates the bone part image Gb obtained by extracting only the bone part of the subject H included in the first radiation image G1 and the second radiation image G2 by performing weighting subtraction between the corresponding pixels, on the first radiation image G1 and the second radiation image G2, as shown in Expression (4). Note that, in Expression (4), α1 is a weighting coefficient, and x and y are coordinates of each pixel of the bone part image Gb.

$$Gb(x,y)=G1(x,y)-\alpha 1\times G2(x,y) \qquad (4)$$

The first derivation unit 24 derives a fat percentage distribution of the subject H as described below. A fat percentage means a ratio of fat in the soft tissue of the human body.

The second derivation unit 25 derives a bone density image representing the bone density in the bone region of the subject H based on the bone part image Gb generated by the bone part image derivation unit 23. The second derivation unit 25 derives a bone density image B by deriving the bone density $B(x,y)$ for each pixel (x,y) of the bone part image Gb. Note that the bone density $B(x,y)$ may be derived for all the bones included in the bone part image Gb or the bone density $B(x,y)$ may be derived only for a predetermined bone. As an example, in the present embodiment, the femur included in the bone part image Gb is used as the predetermined bone in the bone part image Gb, and the second derivation unit 25 derives the bone density $B(x,y)$ for each pixel of the bone region corresponding to the femur and does not derive the bone density $B(x,y)$ for the bone region corresponding to other bones included in the bone part image Gb. Hereinafter, the bone region from which the second derivation unit 25 derives the bone density $B(x,y)$ refers to the bone region corresponding to the femur.

Specifically, the second derivation unit 25 derives the bone density $B(x,y)$ corresponding to each pixel by converting each pixel value $Gb(x,y)$ of the bone region of the bone part image Gb into the pixel value of the bone part image in a case of being acquired under a standard imaging condition. More specifically, the second derivation unit 25 derives the bone density $B(x,y)$ for each pixel by correcting each pixel value $Gb(x,y)$ of the bone part image Gb by using the correction coefficient acquired from a look-up table described below.

Here, a contrast (that is, a difference between the pixel values) between a soft part and a bone part in the radiation image is lower as the tube voltage in the radiation source 3 is higher and the energy of the radiation emitted from the radiation source 3 is higher. In addition, in a procedure of the radiation transmitted through the subject H, a low-energy component of the radiation is absorbed by the subject H, and beam hardening occurs in which the radiation energy is increased. The increase in the radiation energy due to the beam hardening is larger as the body thickness of the subject H is larger.

Figure 5:
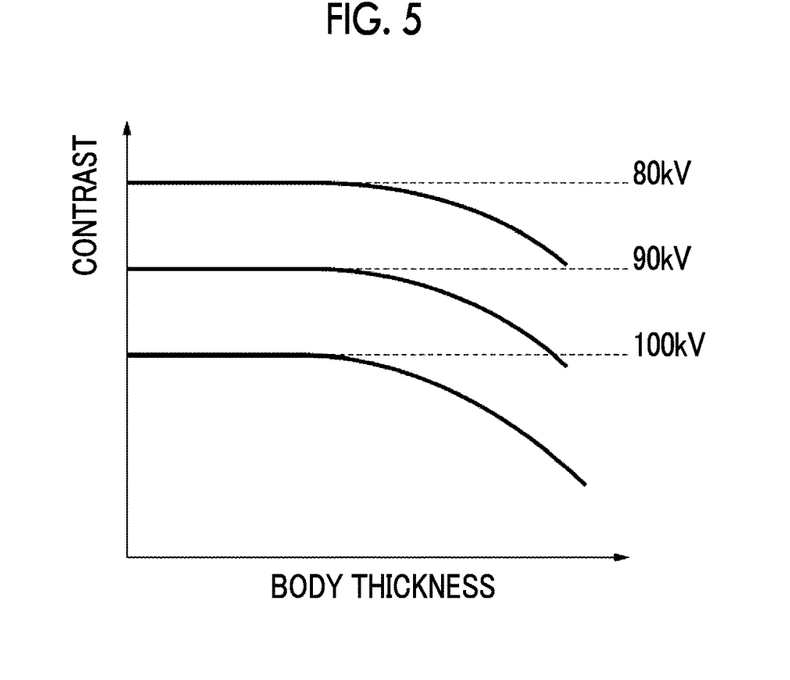
FIG. 5 is a diagram showing a relationship between a contrast of a bone part and a soft part with respect to a body thickness.

FIG. 5 is a diagram showing a relationship of the contrast between the bone part and the soft part with respect to the body thickness of the subject H. Note that FIG. 5 shows the relationship of the contrast between the bone part and the soft part with respect to the body thickness of the subject H at the three tube voltages of 80 kV, 90 kV, and 100 kV. As shown in FIG. 5, the contrast is lower as the tube voltage is higher. In addition, in a case in which the body thickness of the subject H exceeds a certain value, the contrast is lower as the body thickness is larger. Note that contrast between the bone part and the soft part is higher as the pixel value $Gb(x,y)$ of the bone region in the bone part image Gb is larger. Therefore, the relationship shown in FIG. 5 shifts to a higher contrast side as the pixel value $Gb(x,y)$ of the bone region in the bone part image Gb is increased.

In the present embodiment, the look-up table (not shown) for acquiring the correction coefficient for correcting the difference in the contrast depending on the tube voltage during imaging and the decrease in the contrast due to the influence of the beam hardening in the bone part image Gb is stored in the storage 13. The correction coefficient is the coefficient for correcting each pixel value $Gb(x,y)$ of the bone part image Gb.

Figure 6:
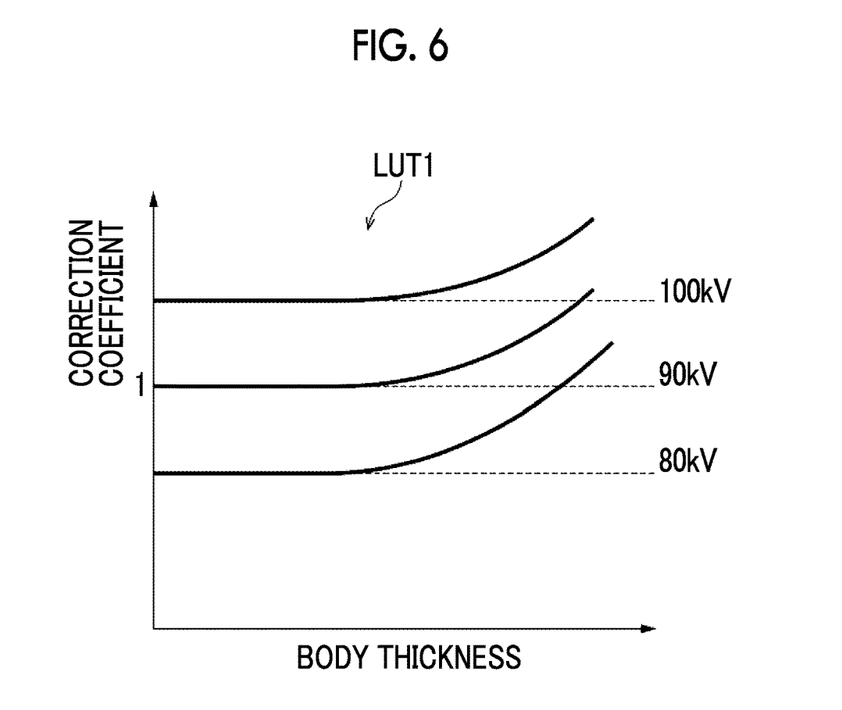
FIG. 6 is a diagram showing an example of a look-up table for acquiring a correction coefficient.

FIG. 6 is a diagram showing an example of the look-up table stored in the storage 13. In FIG. 6, a look-up table LUT1 in which the standard imaging condition is set to the tube voltage of 90 kV is shown. As shown in FIG. 6, in the look-up table LUT1, the correction coefficient is set to be larger as the tube voltage is higher and the body thickness of the subject is larger. In the example shown in FIG. 6, since the standard imaging condition is the tube voltage of 90 kV, the correction coefficient is 1 in a case in which the tube voltage is 90 kV and the body thickness is 0. Note that although the look-up table LUT1 is shown in two dimensions in FIG. 6, the correction coefficient differs depending on the pixel value of the bone region. Therefore, the look-up table LUT1 is actually a three-dimensional table to which an axis representing the pixel value of the bone region is added.

Here, the correction coefficient is derived by capturing the radiation image using a phantom that simulates the human body, including a substance corresponding to the soft tissue and a substance corresponding to the bone tissue of the human body. For example, acrylic or urethane can be applied as the substance corresponding to the soft tissue. In addition, for example, hydroxyapatite and the like can be applied as the substance corresponding to the bone tissue of the human body. Note that, for the substance corresponding to the soft tissue in the phantom, the attenuation coefficient of the radiation and the fat percentage are predetermined values corresponding to the substance. Here, as described above, the contrast between the bone part and the soft part is smaller as the body thickness of the subject is larger. As a result, in a case in which the body thickness is the same, the bone density derived from the radiation image is decreased as the body thickness is increased, even in a case in which the bone density is the same.

Therefore, the pixel values of the bone region in accordance with the body thickness are derived from the radiation image acquired by imaging the phantom having various thicknesses, and the correction coefficient in accordance with the body thickness is derived such that the derived pixel values have the same bone density. In addition, the correction coefficient is derived in accordance with various tube voltages. As a result, the look-up table LUT1 shown in FIG. 6 can be derived.

The second derivation unit 25 extracts the body thickness distribution T(x,y) of the subject H and a correction coefficient C0(x,y) for each pixel depending on the imaging condition including a set value of the tube voltage stored in the storage 13 from the look-up table LUT1. Moreover, as shown in Expression (5), the second derivation unit 25 multiplies each pixel value Gb(x,y) of the bone region in the bone part image Gb by the correction coefficient C0(x,y) to derive a bone density B(x,y) for each pixel of the bone part image Gb. As a result, the bone density image B having the bone density B(x,y) as the pixel value is derived. The bone density B(x,y) derived in this way is acquired by imaging the subject H by the tube voltage of 90 kV, which is the standard imaging condition, and represents the pixel value of the bone part in the bone region included in the radiation image from which the influence of the beam hardening is removed. Note that, in the present embodiment, a unit of bone density is g/cm².

$$B(x,y)=C0(x,y) \times Gb(x,y) \qquad (5)$$

By the way, the attenuation coefficient of the radiation is changed depending on the fat percentage of the soft part. Therefore, even in a case in which a body thickness is the same, the influence of beam hardening of the radiation is changed depending on the fat percentage. Specifically, a ratio of relatively low-energy radiation in the energy of the transmitted radiation is higher as the fat percentage is higher, so that the contrast of the bone region in the acquired radiation image is increased. As a result, the pixel value Gb(x,y) of the bone part image Gb is increased as the fat percentage is increased. In addition, the look-up table LUT1 shown in FIG. 6 is derived by using the phantom. The fat percentage of the substance corresponding to the soft tissue in the phantom is a fixed value. Therefore, in a case in which the pixel value Gb(x,y) of the bone part image Gb is corrected by using the look-up table shown in FIG. 6, a bone density different from an actual bone density is derived depending on the fat percentage.

Therefore, in the present embodiment, it is considered that the fat percentage for each pixel is derived from the first and second radiation images G1 and G2, the correction coefficient is derived in advance such that the pixel value Gb(x,y) is smaller as the fat percentage is higher, and the pixel value Gb(x,y) of the bone part image Gb is corrected by using the correction coefficient.

However, in a case in which the look-up table LUT1 shown in FIG. 6 is further provided in accordance with the fat percentage, an operation load is increased in a case of acquiring the correction coefficient. Therefore, in the present embodiment, the change in the fat percentage is converted into the change in the body thickness of the soft part which is a standard (hereinafter, referred to as the standard soft part), and the bone density B(x,y) is derived from the pixel value Gb(x,y) of the bone part image Gb by using only the body thickness without using the fat percentage. In the present embodiment, as the standard soft part, the soft tissue in the phantom used to derive the correction coefficient in the look-up table LUT1 is used. Therefore, the standard soft part has a predetermined attenuation coefficient and fat percentage in accordance with the substance corresponding to the soft tissue of the phantom. In the following, the conversion of the change in the fat percentage to the change in the body thickness of the standard soft part will be described.

The fat percentage is derived by the first derivation unit 24. First, the first derivation unit 24 generates a soft part image Gs obtained by extracting the soft part of the subject H included in each of the radiation images G1 and G2, from the first and second radiation images G1 and G2, by Expression (6). In Expression (6), α2 is a weighting coefficient.

$$Gs(x,y)=G1(x,y)-\alpha2 \times G2(x,y) \qquad (6)$$

Further, the first derivation unit 24 derives a fat percentage rf(x,y) at each pixel position (x,y) in the soft part image Gs by Expression (7). The fat percentage rf(x,y) at each pixel position (x,y) in the soft part image Gs is an example of a fat percentage distribution according to the present disclosure. Note that, in Expression (7), αm is a weighting coefficient in accordance with an attenuation coefficient of a muscle tissue, and αf is a weighting coefficient in accordance with an attenuation coefficient of a fat tissue. In addition, Δ(x,y) represents a concentration difference distribution. The concentration difference distribution is a distribution of a concentration change on the image, which is seen from a concentration obtained by making the radiation reach the first radiation detector 5 and the second radiation detector 6 without transmitted through the subject H. The distribution of the concentration change on the image is calculated by subtracting the concentration of each pixel in the region of the subject H from the concentration in a blank region obtained by directly emitting the radiation in the soft part image Gs to the first radiation detector 5 and the second radiation detector 6.

$$rf(x,y)=\{\alpha m-\Delta(x,y)/T(x,y)\}/(\alpha m-\alpha f) \qquad (7)$$

Figure 7:
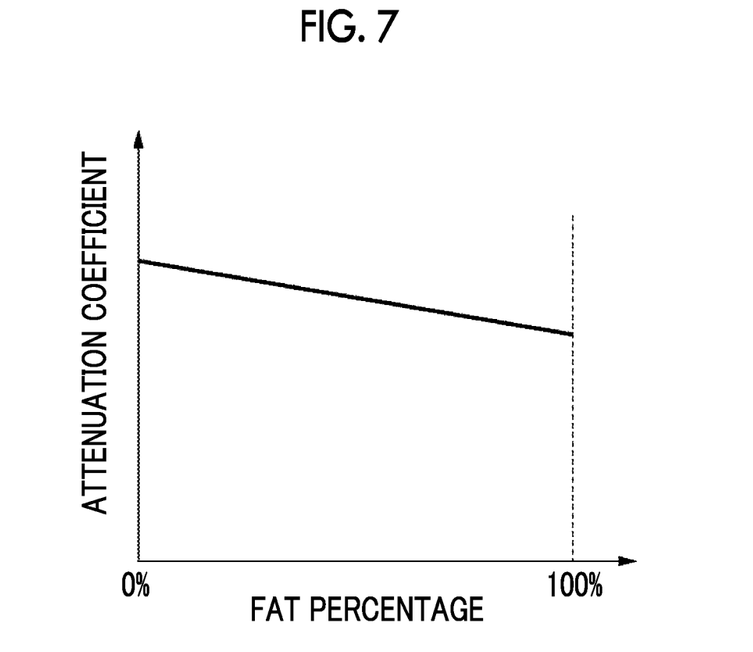
FIG. 7 is a diagram showing a relationship between a fat percentage and an attenuation coefficient.
Figure 8:
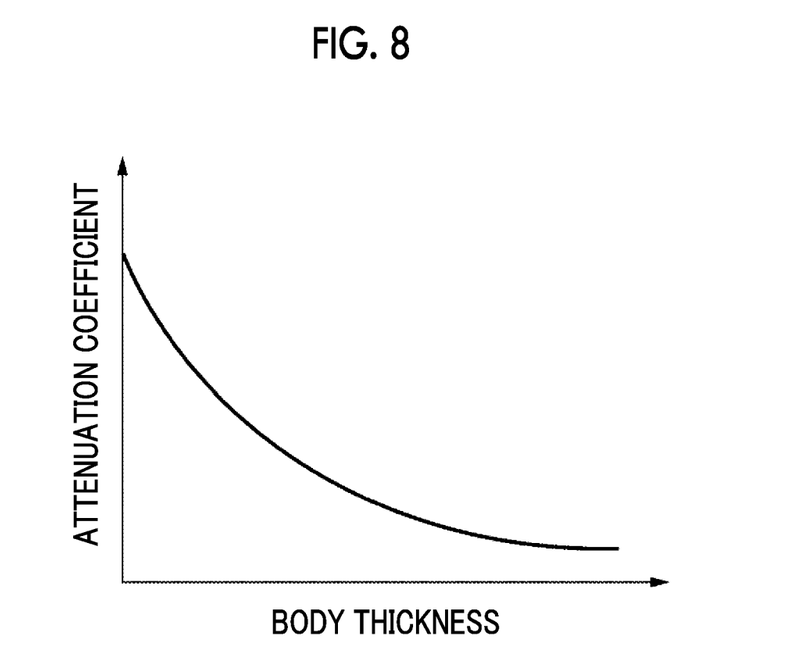
FIG. 8 is a diagram showing a relationship between a body thickness and the attenuation coefficient.

The second derivation unit 25 obtains the body thickness at which the transmitted radiation dose is the same with respect to the attenuation coefficient of the standard soft part, and converts the change in the fat percentage into the change in the body thickness. Here, since the attenuation coefficient of the soft tissue of the subject H depends on the fat percentage rf and a body thickness T, the attenuation coefficient of the soft tissue is represented by μ(rf,T). In a case in which the body thickness T is fixed, a relationship between fat percentage and attenuation coefficient is as shown in FIG. 7. In addition, in a case in which the fat percentage is fixed, a relationship between the body thickness and the attenuation coefficient is as shown in FIG. 8. In a case in which an incident X-ray dose is I0 and the X-ray dose transmitted through the subject H is Ih, Ih is represented by Expression (8) using the attenuation coefficient μ(rf,T). Note that, in Expression (8) and Expressions (9) and (10), the value is derived for each pixel, buT(x,y) is omitted.

$$Ih=I0 \cdot \exp(-\mu(rf,T) \cdot T) \qquad (8)$$

On the other hand, in the radiation image acquired by imaging the phantom, the fat percentage of each pixel of the standard soft part (that is, the region of the substance corresponding to the soft tissue) is rf1(x,y), the body thickness of the standard soft part is T1(x,y), and the attenuation coefficient of the standard soft part is μ(rf1,T1). In this case, in a case in which the incident X-ray dose is I0 and the X-ray dose transmitted through the region of the substance corresponding to the soft tissue in the phantom is I1, I1 is represented by Expression (9).

$$I1=I0 \cdot \exp(-\mu(rf1,T1) \cdot T1) \qquad (9)$$

Note that, since the fat percentage of the standard soft part is fixed, the attenuation coefficient μ(rf1,T1) depends only on the body thickness T1. Therefore, the attenuation coefficient of the standard soft part can be represented by μ(T1).

In a case in which transmission doses of the subject H and the subject having the standard soft part are the same, Ih=I1, and thus T1 in which μ(rf,T)·T=μ(T1)·T1 is derived from Expressions (8) and (9). Here, in a case in which ΔI=I1−Ih, the following expression is established.

$$\Delta I = \mu(T1) \cdot T1 - \mu(rf, T) \cdot T \quad (10)$$

In Expression (10), since μ(T1) is changed in a case in which T1 is changed, T1 in which $(\Delta I)^2$ is minimum is derived. Specifically, by gradually increasing or decreasing T1 from an initial value (for example, T) and changing T1 such that $(\Delta I)^2$ is decreased, T1 in which $(\Delta I)^2$ is minimum is derived.

Moreover, by obtaining a relationship between the fat percentage and a ratio (TUT) of the derived T1 to the body thickness T of the subject H, the body thickness of the subject H with a certain fat percentage can be converted into the body thickness T1 of the standard soft part. In a case in which the ratio (TUT) of the derived T1 to the body thickness T of the subject H is a body thickness conversion coefficient K(x,y), a relationship between the fat percentage and the body thickness conversion coefficient is as shown in FIG. 9.

Figure 9:
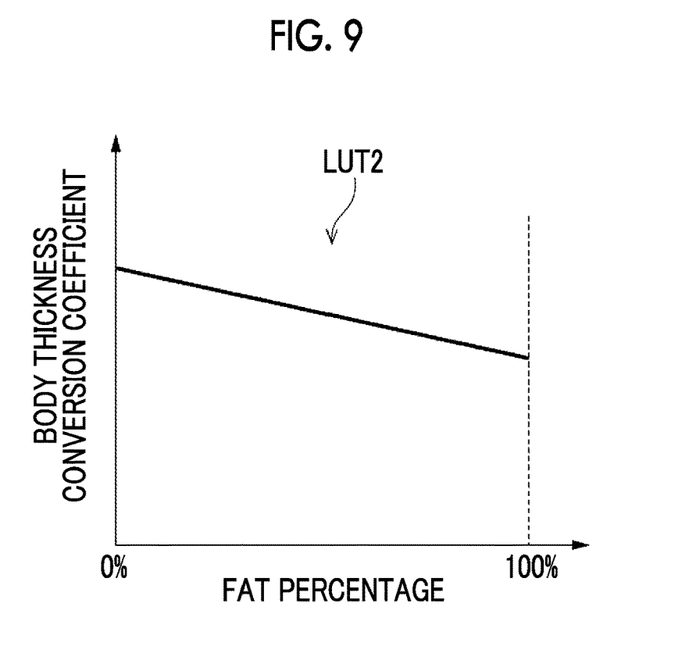
FIG. 9 is a diagram showing a relationship between the fat percentage and a body thickness conversion coefficient.

In the present embodiment, the relationship between the fat percentage and the body thickness conversion coefficient shown in FIG. 9 is stored in the storage 13 as a look-up table LUT2. Moreover, the first derivation unit 24 derives the soft part image Gs of the subject H by Expression (6), and derives the fat percentage rf(x,y) for each pixel of the soft part image Gs by Expression (7). Moreover, the second derivation unit 25 refers to the look-up table LUT2 to derive the body thickness conversion coefficient K(x,y) corresponding to the fat percentage rf(x,y), and converts the body thickness T(x,y) of the subject H into the body thickness T1(x,y) of the standard soft part. Moreover, the second derivation unit 25 refers to the look-up table LUT1 shown in FIG. 6 to derive the correction coefficient C0(x,y) corresponding to the derived body thickness T1(x,y), and derives the bone density B(x,y) by Expression (5).

Note that, in the scattered ray removal unit 22, the body thickness distribution T(x,y) and the scattered ray component are derived by Expressions (1) to (3), but the attenuation coefficient of the standard soft part is used as the attenuation coefficient μSoft(T(x,y)) used in this case.

Figure 10:
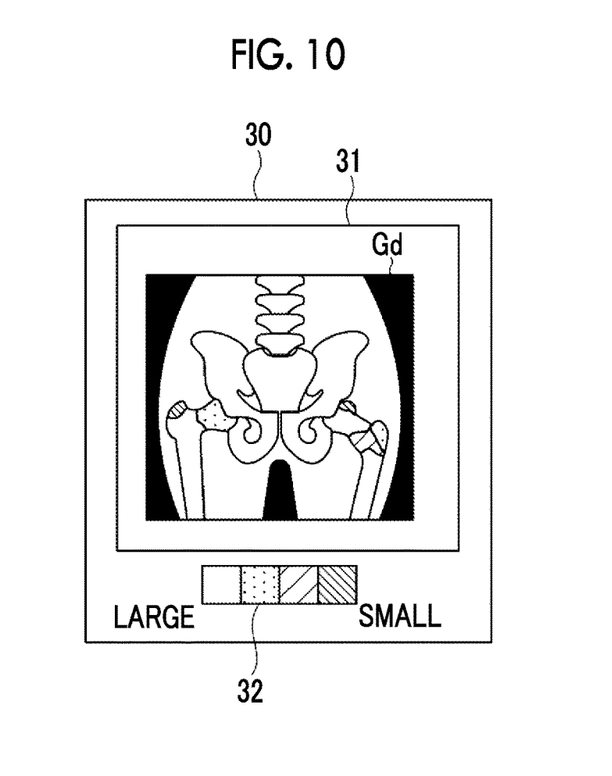
FIG. 10 is a diagram showing a display screen.

The display controller 26 displays the bone density estimated by the second derivation unit 25 on the display 14. FIG. 10 is a diagram showing a display screen of the bone density. As shown in FIG. 10, a display screen 30 has an image display region 31. In the image display region 31, a bone density image Gd representing a bone density distribution in the radiation image of the subject H is displayed. In the bone density image Gd, a pattern is added to the bone region in accordance with the magnitude of the derived bone density. Note that, in FIG. 10, for the sake of simplicity of description, the pattern representing the bone density is added only to the femur. Below the image display region 31, a reference 32 representing the magnitude of the bone density for the added pattern is displayed. The operator can easily recognize the bone density of the patient by interpreting the bone density image Gd with reference to the reference 32. Note that different colors may be added to the bone density image Gd depending on the bone density instead of the pattern.

Figure 11:
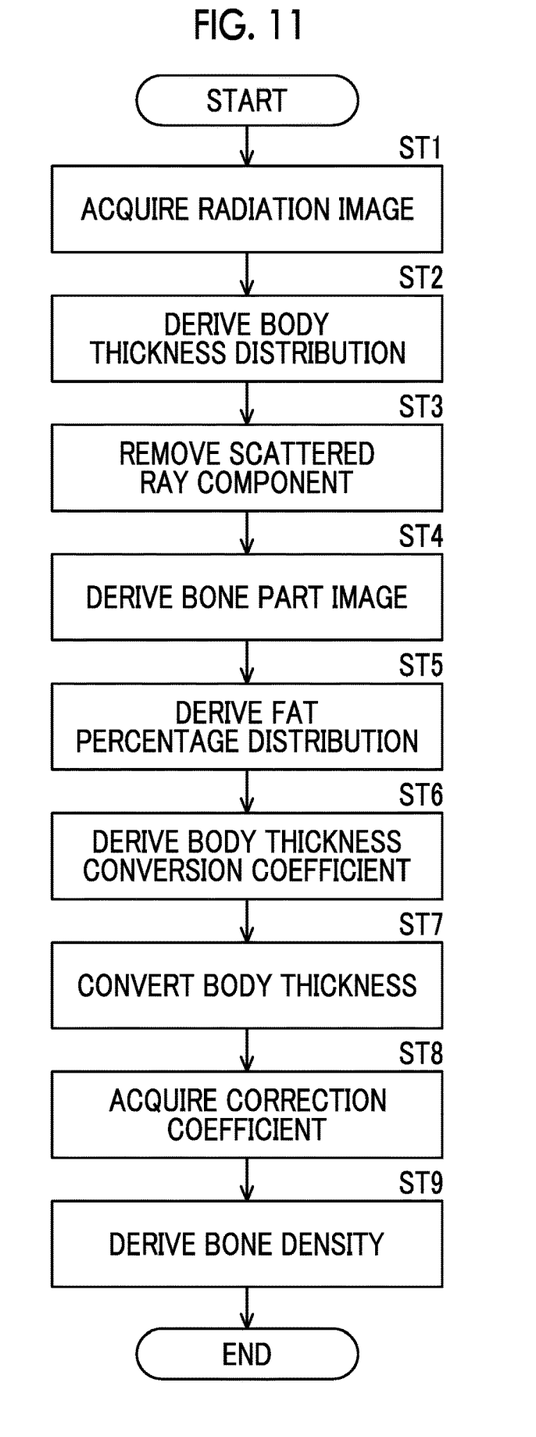
FIG. 11 is a flowchart showing processing performed in the present embodiment.

Then, processing performed in the present embodiment will be described. FIG. 11 is a flowchart showing processing performed in the present embodiment. The image acquisition unit 21 causes the imaging apparatus 1 to perform the energy subtraction imaging of the subject H to acquire the first and second radiation images G1 and G2 (radiation image acquisition; step ST1). Then, the scattered ray removal unit 22 derives the body thickness distribution T(x,y) of the subject H (step ST2), and removes the scattered ray components from the first and second radiation images G1 and G2 (step ST3). Note that pieces of processing of steps ST2 and ST3 are performed in parallel. In addition, the bone part image derivation unit 23 derives the bone part image Gb obtained by extracting the bone part of the subject H from the first and second radiation images G1 and G2 from which the scattered ray components are removed (step ST4).

Next, the first derivation unit 24 derives the soft part image Gs obtained by extracting the soft part of the subject H by Expression (6) from the first and second radiation images G1 and G2 from which the scattered ray components are removed, and derives the fat percentage rf(x,y) of the subject H from the soft part image Gs (step ST5). Moreover, the second derivation unit 25 refers to the look-up table LUT2 shown in FIG. 9 to derive the body thickness conversion coefficient K(x,y) corresponding to the fat percentage rf(x,y) (step ST6). Further, the second derivation unit 25 converts the body thickness of the subject H into the body thickness of the standard soft part by using the body thickness conversion coefficient K(x,y) (body thickness conversion; step ST7). Subsequently, the second derivation unit 25 refers to the look-up table LUT1 shown in FIG. 6 to acquire the correction coefficient C0(x,y) corresponding to the converted body thickness of the subject H (step ST8) and derives the bone density B(x,y) by using the acquired correction coefficient C0(x,y) (step ST9), and the processing is terminated.

As described above, in the present embodiment, the bone density in the bone region of the subject is derived based on the bone part image of the subject H and the fat percentage distribution. Therefore, since the derived bone density takes the fat percentage into consideration, the bone density can be derived with high accuracy according to the present embodiment.

Particularly, in the present embodiment, since the body thickness distribution T(x,y) of the subject is converted into the body thickness distribution T1(x,y) of the standard soft part in accordance with the fat percentage distribution of the subject H, it is not necessary to prepare the look-up table LUT1 for obtaining the correction coefficient C0(x,y) for converting the pixel value Gb(x,y) of the bone part image Gb into the bone density in accordance with the fat percentage. Therefore, it is possible to reduce the operation load in a case of deriving the bone density.

In addition, by deriving the fat percentage distribution and deriving the bone density by using the first and second radiation images G1 and G2 from which scattered ray components are removed, the bone density can be derived with higher accuracy.

In addition, as shown in FIG. 1, since the bone density can be derived by using the radiation image acquired by an imaging method (hereinafter, referred to as simple imaging) in which the subject H is irradiated with the radiation to acquire a two-dimensional image which is a transmission image of the subject H, the bone density can be derived more easily than in a case in which the bone density is derived by an apparatus using the DXA method or a computed tomography (CT) apparatus. Therefore, the radiation image processing device according to the present embodiment can be applied to continuous use, such as medical check-up or treatment follow-up observation.

Note that, in the embodiment described above, the bone density for the femur in the vicinity of a hip joint is derived or displayed, but a target bone is not limited to the femur. The technology of the present disclosure can also be applied in a case of estimating the information relating to the bone density for any bone part, such as the femur and tibia in the vicinity of a knee joint, a vertebra, such as a lumbar vertebra, a heel bone, and a metacarpal bone.

In addition, in the embodiment described above, the bone density image is displayed on the display screen 30, but the present disclosure is not limited to this. The second derivation unit 25 may derive a representative value of the bone density of a target part (for example, around a joint of the femur) and display the derived representative value of the bone density. An average value, a median value, a maximum value, a minimum value, and the like of the bone density can be used as the representative value.

In addition, in the embodiment described above, the bone density is derived based on the bone part image Gb and the fat percentage distribution, but the bone density may be derived based on the bone part image Gb and the muscle percentage distribution. Here, a soft tissue in the human body includes a muscle tissue, a fat tissue, an internal organ, blood, and water. Since the muscle tissue, the internal organ, blood, and water have similar radiation absorption characteristics, a non-fat tissue including the internal organ, blood, and water in the muscle tissue can be treated as the muscle tissue. Therefore, a muscle percentage rm(x,y) can be derived from Expression (11) from the fat percentage rf(x,y) derived from Expression (7). The muscle percentage rm(x,y) is an example of a muscle percentage distribution according to the present disclosure. Note that, in a femoral region of the human body, the main components of the soft tissue are the muscle tissue and the fat tissue, so that the muscle percentage may be derived by approximating the non-fat tissue to the muscle tissue.

$$rm(x,y)=1-rf(x,y) \tag{11}$$

Note that, in a case in which the body thickness T is fixed, a relationship between the muscle percentage and the attenuation coefficient is monotonously increased, unlike the relationship between the fat percentage and the attenuation coefficient shown in FIG. 7, which is monotonously decreased. Therefore, a relationship between the muscle percentage and the body thickness conversion coefficient also is monotonously increased, unlike the relationship between the fat percentage and the body thickness conversion coefficient shown in FIG. 9, which is monotonously decreased. Therefore, the relationship between the muscle percentage and the body thickness conversion coefficient can be derived and stored in the storage 13, and the body thickness conversion coefficient corresponding to the muscle percentage rm(x,y) can be derived by referring to this relationship to convert the body thickness T(x,y) of the subject H into the body thickness T1(x,y) of the standard soft part by using the derived body thickness conversion coefficient. Therefore, similarly to the embodiment described above using the fat percentage, the correction coefficient C0(x,y) corresponding to the derived body thickness T1(x,y) can be derived to derive the bone density B (x,y) by Expression (5).

In addition, in the embodiment described above, the first and second radiation images G1 and G2 are acquired by the one-shot method in a case in which the energy subtraction processing is performed for deriving the bone density, but the present disclosure is not limited to this. The first and second radiation images G1 and G2 may be acquired by a so-called two-shot method in which imaging is performed twice by using only one radiation detector. In a case of the two-shot method, a position of the subject H included in the first radiation image G1 and the second radiation image G2 may shift due to a body movement of the subject H. Therefore, in the first radiation image G1 and the second radiation image G2, it is preferable to perform the processing according to the present embodiment after registration of the subject is performed.

In addition, in the embodiment described above, the bone density is derived by using the radiation image acquired in the system that images the subject H using the first and second radiation detectors 5 and 6, but it is needless to say that the technology of the present disclosure can be applied even in a case in which the first and second radiation images G1 and G2 are acquired using an accumulative phosphor sheet instead of the radiation detector. In this case, the first and second radiation images G1 and G2 need only be acquired by stacking two accumulative phosphor sheets, emitting the radiation transmitted through the subject H, accumulating and recording radiation image information of the subject H in each of the accumulative phosphor sheets, and photoelectrically reading the radiation image information from each of the accumulative phosphor sheets. Note that the two-shot method may also be used in a case in which the first and second radiation images G1 and G2 are acquired by using the accumulative phosphor sheet.

In addition, the radiation in the embodiment described above is not particularly limited, and α-rays or γ-rays can be used in addition to X-rays.

In addition, in the embodiment described above, for example, various processors shown below can be used as the hardware structures of processing units that execute various pieces of processing, such as the image acquisition unit 21, the scattered ray removal unit 22, the bone part image derivation unit 23, the first derivation unit 24, the second derivation unit 25, and the display controller 26 of the radiation image processing device 10. As described above, the various processors include, in addition to the CPU that is a general-purpose processor which executes software (program) and functions as various processing units, a programmable logic device (PLD) that is a processor whose circuit configuration can be changed after manufacture, such as a field programmable gate array (FPGA), and a dedicated electrical circuit that is a processor having a circuit configuration which is designed for exclusive use in order to execute a specific processing, such as an application specific integrated circuit (ASIC).

One processing unit may be configured by one of these various processors, or may be configured by a combination of two or more processors of the same type or different types (for example, a combination of a plurality of FPGAs or a combination of the CPU and the FPGA). In addition, a plurality of the processing units may be configured by one processor.

As an example of configuring the plurality of processing units by one processor, first, as represented by a computer of a client, a server, and the like there is an aspect in which one processor is configured by a combination of one or more CPUs and software and this processor functions as a plurality of processing units. Second, as represented by a system on chip (SoC) or the like, there is an aspect of using a processor that realizes the function of the entire system including the plurality of processing units by one integrated circuit (IC) chip. In this way, as the hardware structure, the various processing units are configured by using one or more of the various processors described above.

Further, as the hardware structures of these various processors, more specifically, it is possible to use an electrical circuit (circuitry) in which circuit elements, such as semiconductor elements, are combined.

What is claimed is:

1. A radiation image processing device comprising:
   at least one processor,
   wherein the processor
      derives a bone part image of a subject including a bone part based on a first radiation image and a second radiation image acquired by imaging the subject with radiation having different energy distributions,
      derives a fat percentage distribution of the subject based on the first radiation image and the second radiation image,
      derives a bone density in a bone region of the subject based on the bone part image, and the fat percentage distribution,
      derives a body thickness distribution of the subject based on the first radiation image and the second radiation image,
      refers to a look-up table (LUT2) storing a conversion coefficient for converting a fat percentage of the subject into a body thickness of a standard soft part, the body thickness of the standard soft part having a same attenuation coefficient of transmitted radiation dose due to the fat percentage of the subject, to acquire the conversion coefficient in accordance with the fat percentage distribution,
      wherein the conversion coefficient is a ratio (T1/T) of a body thickness of the standard soft part (T1) to a body thickness of the subject (T),
      converts the body thickness distribution of the subject into the body thickness distribution of the standard soft part by converting the body thickness distribution of the subject by the conversion coefficient, using the acquired conversion coefficient,
      refers to a look-up table (LUT1) derived from imaging a phantom consisting of substances corresponding to the standard soft part and having various thicknesses, the look-up table (LUT1) storing a relationship between the body thickness distribution of the standard soft part and a correction coefficient for correcting a pixel value of the bone part image to the bone density to acquire the correction coefficient $(C0(x,y))$ in accordance with the body thickness distribution of the standard soft part, and
      derives the bone density by correcting the bone part image by the correction coefficient $(C0(x,y))$.

2. The radiation image processing device according to claim 1,
   wherein the processor
      removes a scattered ray component based on the radiation scattered by the subject from the first radiation image and the second radiation image, and
      performs derivation of the fat percentage distribution, and derivation of the bone density by using the first and second radiation images from which the scattered ray components are removed.

3. The radiation image processing device according to claim 1,
   wherein the processor displays the bone density on a display.

4. A radiation image processing method comprising:
   deriving a bone part image of a subject including a bone part based on a first radiation image and a second radiation image acquired by imaging the subject with radiation having different energy distributions;
   deriving a fat percentage distribution of the subject based on the first radiation image and the second radiation image;
   deriving a bone density in a bone region of the subject based on the bone part image, and the fat percentage distribution;
   deriving a body thickness distribution of the subject based on the first radiation image and the second radiation image;
   referring to a look-up table (LUT2) storing a conversion coefficient for converting a fat percentage of the subject into a body thickness of a standard soft part, the body thickness of the standard soft part having a same attenuation coefficient of transmitted radiation dose due to the fat percentage of the subject, to acquire the conversion coefficient in accordance with the fat percentage distribution,
   wherein the conversion coefficient is a ratio (T1/T) of a body thickness of the standard soft part (T1) to a body thickness of the subject (T);
   converting the body thickness distribution of the subject into the body thickness distribution of the standard soft part by converting the body thickness distribution of the subject by the conversion coefficient, using the acquired conversion coefficient;
   referring to a look-up table (LUT1) derived from imaging a phantom consisting of substances corresponding to the standard soft part and having various thicknesses, the look-up table (LUT1) storing a relationship between the body thickness distribution of the standard soft part and a correction coefficient for correcting a pixel value of the bone part image to the bone density to acquire the correction coefficient $(C0(x,y))$ in accordance with the body thickness distribution of the standard soft part; and
   deriving the bone density by correcting the bone part image by the correction coefficient $(C0(x,y))$.

5. A non-transitory computer-readable storage medium that stores a radiation image processing program causing a computer to execute:
   a procedure of deriving a bone part image of a subject including a bone part based on a first radiation image and a second radiation image acquired by imaging the subject with radiation having different energy distributions;
   a procedure of deriving a fat percentage distribution of the subject based on the first radiation image and the second radiation image;
   a procedure of deriving a bone density in a bone region of the subject based on the bone part image, and the fat percentage distribution;
   a procedure of deriving a body thickness distribution of the subject based on the first radiation image and the second radiation image;
   a procedure of referring to a look-up table (LUT2) storing a conversion coefficient for converting a fat percentage of the subject into a body thickness of a standard soft part, the body thickness of the standard soft part having a same attenuation coefficient of transmitted radiation dose due to the fat percentage of the subject, to acquire the conversion coefficient in accordance with the fat percentage distribution, wherein the conversion coefficient is a ratio (T1/T) of a body thickness of the standard soft part (T1) to a body thickness of the subject (T);

a procedure of converting the body thickness distribution of the subject into the body thickness distribution of the standard soft part by converting the body thickness distribution of the subject by the conversion coefficient, using the acquired conversion coefficient;

a procedure of referring to a look-up table (LUT1) derived from imaging a phantom consisting of substances corresponding to the standard soft part and having various thicknesses, the look-up table (LUT1) storing a relationship between the body thickness distribution of the standard soft part and a correction coefficient for correcting a pixel value of the bone part image to the bone density to acquire the correction coefficient (C0($x,y$)) in accordance with the body thickness distribution of the standard soft part; and a procedure of deriving the bone density by correcting the bone part image by the correction coefficient (C0($x,y$)).

* * * * *